Patented Dec. 21, 1937

2,102,737

UNITED STATES PATENT OFFICE 2,102,737

PREPARATION OF ANTIMONY CHLORIDES

Ferdinand W. Peck, Penns Grove, N. J., and William R. Waldron, Wilmington, Del., assignors to E. I. du Pont de Nemours & Company, Wilmington, Del., a corporation of Delaware No Drawing. Application February 28, 1934
Serial No. 713,400

10 Claims. (Cl. 23—98)

This invention relates to antimony chlorides, more particularly antimony trichloride, and a process for the production thereof. It further relates to the preparation of antimony chloride-solvent mixtures and to the production of flavanthrone from such mixtures by condensation with beta-amino-anthraquinone.

It is known that flavanthrone may be formed by heating beta-amino-anthraquinone with antimony pentachloride. One such method involves heating the beta-amino-anthraquinone with antimony pentachloride in nitrobenzene. Another method involves the preparation of flavanthrone by heating beta-amino-anthraquinone with antimony pentachloride to 160° C. whereby an addition compound of the color with antimony pentachloride is formed, and then decomposing this addition compound to the color compound.

The method of preparing the antimony pentachloride to be used in this condensation is an important factor, since the yields of flavanthrone may vary widely with different methods of preparing the antimony pentachloride, either due to contamination by impurities or, in some cases, probably due to the lack of certain ingredients in the condensation process.

A number of processes have heretofore been proposed for making antimony chlorides. One of these processes consists in burning antimony in chlorine, in this way forming the pentachloride directly. When the pentachloride is thus produced, however, it contains the chlorine addition product which is disastrous to a high yield of flavanthrone.

Antimony trichloride may be prepared by treating antimony with chlorine while maintaining an excess of antimony at all times. It may be prepared, also, by dissolving antimony oxide in a large excess of concentrated hydrochloric acid, but in doing this the oxychloride is always formed. On distillation, considerable proportions of the trichloride distil with the water and acid, and there is also obtained an oxychloride residue. This reaction is very corrosive and it is difficult to find materials suitable for plant equipment.

Antimony trichloride may also be formed by the action of aqua regia on the metal. This process has been modified by chlorinating a suspension of antimony in 20% to 25% hydrochloric acid. Another process for the preparation of antimony trichloride involves the reaction of antimony sulfide with chlorine gas. The antimony sulfide is diluted with an inert material such as sand and the trichloride, after its formation, is treated with additional antimony sulfide to remove arsenic. It is also possible to produce antimony trichloride by reacting together metallic antimony and antimony pentachloride, but such a process is hazardous since the reaction occurs with almost explosive violence.

One of the objects of this invention is the provision of a new and improved process for the production of antimony trichloride from metallic antimony in an organic solvent. Another object is the production of antimony trichloride by a process which is substantially non-corrosive, which avoids the formation of the antimony oxychloride as a by-product, and in which the yields of antimony trichloride are high. A further object is the preparation of solvent mixtures of antimony trichloride and antimony pentachloride suitable for the production of flavanthrone in high yields. A still further object is to provide a new and improved route to flavanthrone starting with metallic antimony as one of the raw materials. Other objects will appear hereinafter.

These objects are accomplished by the following invention. Finely ground metallic antimony is suspended in an organic solvent and while stirring to keep the antimony in suspension, chlorine is introduced until a large percentage of the metallic antimony is chlorinated to the trichloride. After the desired amount of metallic antimony has been converted, the antimony chloride-solvent mixture is preferably heated in the presence of the excess of metallic antimony over that theoretically required to convert any antimony pentachloride which may have been formed back to the trichloride. Usually, the amount of antimony pentachloride present is small and is caused by local over-chlorination. After the small amount of pentachloride has been removed by this treatment, the liquid portion of the mixture, comprising substantially the solvent with the antimony trichloride dissolved therein, is separated from the metallic antimony in any suitable manner, for example, by filtration or by decantation, and the liquid then purified, preferably by distillation either at atmospheric or at reduced pressures.

If desired, the antimony trichloride may be recovered as such at this point, in which case it is most convenient to carry out the chlorination of the metallic antimony in a solvent which has a boiling point relatively remote from that of the antimony trichloride. Where it is desired to produce antimony pentachloride, however, the chlorination of the metallic antimony is most conveniently effected in a solvent such as nitrobenzene which has a boiling point not far removed from that of the antimony trichloride. By distilling the crude antimony trichloride-solvent mixture, an antimony trichloride-solvent mixture is obtained which may be further chlorinated with very satisfactory results. The resultant antimony pentachloride-containing mixture may then be reacted with beta-amino-anthraquinone to produce flavanthrone in good yield.

The invention will be further illustrated, but is not limited, by the following example, in which the parts are by weight.

*Example*

Suspend 356 parts of finely ground metallic antimony in 1500 parts of nitrobenzene and, under efficient agitation sufficient to keep the metallic antimony in suspension, introduce 258 parts of chlorine over the course of six to eight hours at a temperature of approximately 35° C. or lower. The addition of chlorine may be regulated by the increase in weight or by an analysis to show the percentage of antimony trichloride in the nitrobenzene solution. This should show the presence of 25% to 27% antimony trichloride. At the end of the chlorination there should be approximately 60 to 65 parts of unreacted antimony, which amounts to approximately 18% excess of metal.

Heat the chlorination charge to 90° C. and hold three hours so that any antimony pentachloride which is formed in small amounts may be transformed to trichloride by reacting with the excess of metal. This reaction may be shown to be complete when there is no increase in the formation of trichloride as shown by analysis. Remove the nitrobenzene-antimony trichloride mixture from the excess of antimony by decantation or filtration, and distil either at atmospheric or reduced pressure, the distillation at reduced pressure being preferable.

Chlorinate the distilled nitrobenzene-antimony trichloride mixture by the introduction of chlorine through a tube leading to the bottom of the vessel while maintaining the temperature at 15° C. to 25° C.

To the resultant antimony pentachloride-containing mixture add beta-amino-anthraquinone with continued agitation and condense to flavanthrone by any suitable method.

In practising the invention, it has been found that the presence of iron or antimony sulfide does not injure the chlorination to the trichloride. The chlorination may, therefore, be carried out in a vessel made of iron materials of construction, i. e., iron, steel, the stainless steels and similar materials.

The state of subdivision of the metallic antimony may vary within relatively wide limits. Antimony metal ground as coarse as 40-mesh has been used satisfactorily. The antimony particles may be larger but, in general, the more finely ground metal chlorinates more easily. Fast agitation is desirable to keep the metal in suspension.

The organic solvent employed in any given step of the process should preferably be substantially inert under the conditions of reaction. The solvent used in the formation of the antimony trichloride may or may not be the same as the solvent used in the formation of the pentachloride. The same is true with respect to the solvent used in the flavanthrone condensation. It is usually advantageous, however, to keep the same solvent when going from one step to the next or, for that matter, in going all the way from metallic antimony to flavanthrone. As examples of solvents which may be used in the formation of the antimony trichloride may be mentioned benzene, toluene, solvent naphtha, carbon tetrachloride, ortho-dichlorobenzene, nitrobenzene, ortho-nitrochlorobenzene and para-nitrochlorobenzene. The nitrobenzene employed may be prepared by the nitration of benzene with nitric acid produced from metal nitrates such as sodium nitrate, or with synthetic nitric acid such as may be obtained by the oxidation of ammonia. It will be recognized that the results with all solvents are not comparable. Benzene and ortho-dichlorobenzene have given as good results as nitrobenzene in the formation of the antimony trichloride.

In the formation of the antimony pentachloride, it is desirable, although not essential, to employ a solvent which may also be used in the flavanthrone condensation. For this purpose high-boiling solvents such as, for example, nitrobenzene, ortho-nitrochlorobenzene and para-nitrochlorobenzene may be mentioned. Nitrobenzene is especially desirable for use in the production of antimony pentachloride and in the production of flavanthrone, on account of the ease with which the reactions proceed and the good yields obtained. In the formation of antimony pentachloride-solvent mixtures and in the subsequent condensation of such mixtures with beta-amino-anthraquinone, better results are obtained with nitrobenzene than with solvents such as ortho-nitrochlorobenzene and para-nitrochlorobenzene.

The chlorination of the metallic antimony to antimony trichloride has been carried out with very satisfactory results without the addition of a catalyst.

The temperature employed in chlorinating the metallic antimony may vary within relatively wide limits. A low chlorination temperature seems to give the best results, though chlorinations at a temperature as high as 85° C. have been made and give satisfactory results with the solvent only slightly chlorinated.

In the formation of antimony trichloride, the rate of chlorination may be increased over that given in the example but, in doing this, the amount of antimony pentachloride formed is increased. The excess of metallic antimony employed in the antimony trichloride formation may be as low as 3% to 5%. This residual antimony may be left in the chlorination vessel and the amount subtracted from the amount of antimony used in the next charge. The yield of antimony trichloride, according to the example, is 98% to 99% of the antimony consumed.

The chlorination proceeds as well with more or less solvent than the quantity stated in the example. In fact, solutions with an antimony trichloride content as high as 45% have been made.

As already indicated, in carrying out the preparation of the antimony trichloride in nitrobenzene with the object in view of preparing flavanthrone, it is desirable to convert any antimony pentachloride present in the reaction mixture obtainable by reacting chlorine with the metallic antimony back to the trichloride prior to distillation. Unless the pentachloride is removed, in the subsequent distillation the pentachloride attacks solvents such as nitrobenzene with a replacement of the nitro group by chlorine and an evolution of nitrogen oxides.

By preparing the antimony trichloride in a solvent and distilling it just before use, it is exceptionally pure and free from contamination from the containers which is brought about by the corrosive action of the trichloride per se. Further, the yield of antimony trichloride in accordance with the present invention is high, no oxychloride is formed, and after distillation the material is exceptionally pure provided the metallic antimony is free from arsenic and bismuth or other metals which have volatile chlorides. There is a decided cost advantage by this process over other methods of preparing antimony trichloride, antimony pentachloride and flavanthrone.

As many apparently widely different embodiments of this invention may be made without departing from the spirit and scope thereof, it is to be understood that we do not limit ourselves to the specific embodiments thereof except as defined in the following claims.

We claim:

1. The process which comprises subjecting metallic antimony in a state of subdivision to chlorination in a substantially inert organic solvent at a temperature not higher than about 85° C., and heating the resultant chlorination reaction mixture to a higher temperature with excess metallic antimony over that theoretically required to convert any antimony pentachloride present to antimony trichloride.

2. The process which comprises subjecting metallic antimony in a state of subdivision to chlorination in a substantially inert organic solvent at a temperature not higher than about 85° C., heating the resultant chlorination reaction mixture to a higher temperature with excess metallic antimony over that theoretically required to convert any antimony pentachloride present to antimony trichloride, and distilling the antimony trichloride prior to further chlorination.

3. The process of producing antimony trichloride which comprises reacting metallic antimony in a state of subdivision with chlorine in an aromatic solvent for antimony trichloride at a temperature not higher than about 85° C., the amount of chlorine being less than the proportions theoretically required to convert all of the antimony to antimony trichloride.

4. The process of producing antimony trichloride which comprises reacting metallic antimony in a state of subdivision with chlorine in a substantially inert organic solvent at a temperature not substantially above 35° C. whereby antimony trichloride and small amounts of antimony pentachloride are formed, and heating the resultant mixture with excess metallic antimony at a higher temperature.

5. The process of producing antimony trichloride which comprises reacting chlorine with metallic antimony suspended in a state of subdivision in nitrobenzene, at a temperature not higher than about 85° C. while maintaining an excess of metallic antimony in the chlorination reaction mixture during the reaction, and then heating the reaction mixture containing the excess metallic antimony to a temperature higher than the chlorination temperature to reconvert by-products.

6. The process which comprises reacting chlorine with metallic antimony suspended in a state of subdivision in nitrobenzene at a temperature not higher than about 85° C., heating the resultant chlorination reaction mixture to a temperature higher than the chlorination temperature with excess metallic antimony over that required to convert any antimony pentachloride present to antimony trichloride, and subjecting the resultant antimony trichloride-nitrobenzene mixture to distillation.

7. The process which comprises suspending about 356 parts of metallic antimony in a state of subdivision not substantially larger than 40-mesh in 1500 parts of nitrobenzene in an iron vessel, reacting therewith, while agitating the mixture, about 258 parts of chlorine introduced over the course of six to eight hours, maintaining the chlorination temperature not substantially higher than 35° C., then heating to about 90° C. for about three hours, separating the nitrobenzene-antimony trichloride mixture from the solid residue, subjecting the separated nitrobenzene-antimony trichloride mixture to distillation, and reacting the distilled nitrobenzene-antimony trichloride mixture with chlorine.

8. The process of preparing antimony trichloride which comprises suspending metallic antimony in a state of subdivision not substantially larger than 40 mesh in nitrobenzene, adding chlorine at a temperature not substantially higher than 35° C. while maintaining an excess of the metallic antimony, and then heating the resultant chlorination reaction mixture containing the excess metallic antimony to a temperature of about 90° C. to reconvert by-products.

9. The process of preparing antimony chloride which comprises reacting chlorine with metallic antimony suspended in a state of subdivision in an aromatic solvent for antimony chloride at a temperature not higher than about 85° C., while maintaining an excess of metallic antimony in the chlorination reaction mixture during the reaction.

10. The process of producing antimony trichloride which comprises reacting metallic antimony in a state of subdivision with chlorine in a high-boiling aromatic solvent for antimony chloride of the class consisting of nitrobenzene, ortho-nitrochlorobenzene and para-nitrochlorobenzene at a temperature not higher than about 85° C., while maintaining an excess of metallic antimony in the chlorination reaction mixture during the reaction.

FERDINAND W. PECK.
WILLIAM R. WALDRON.